Figure 1:
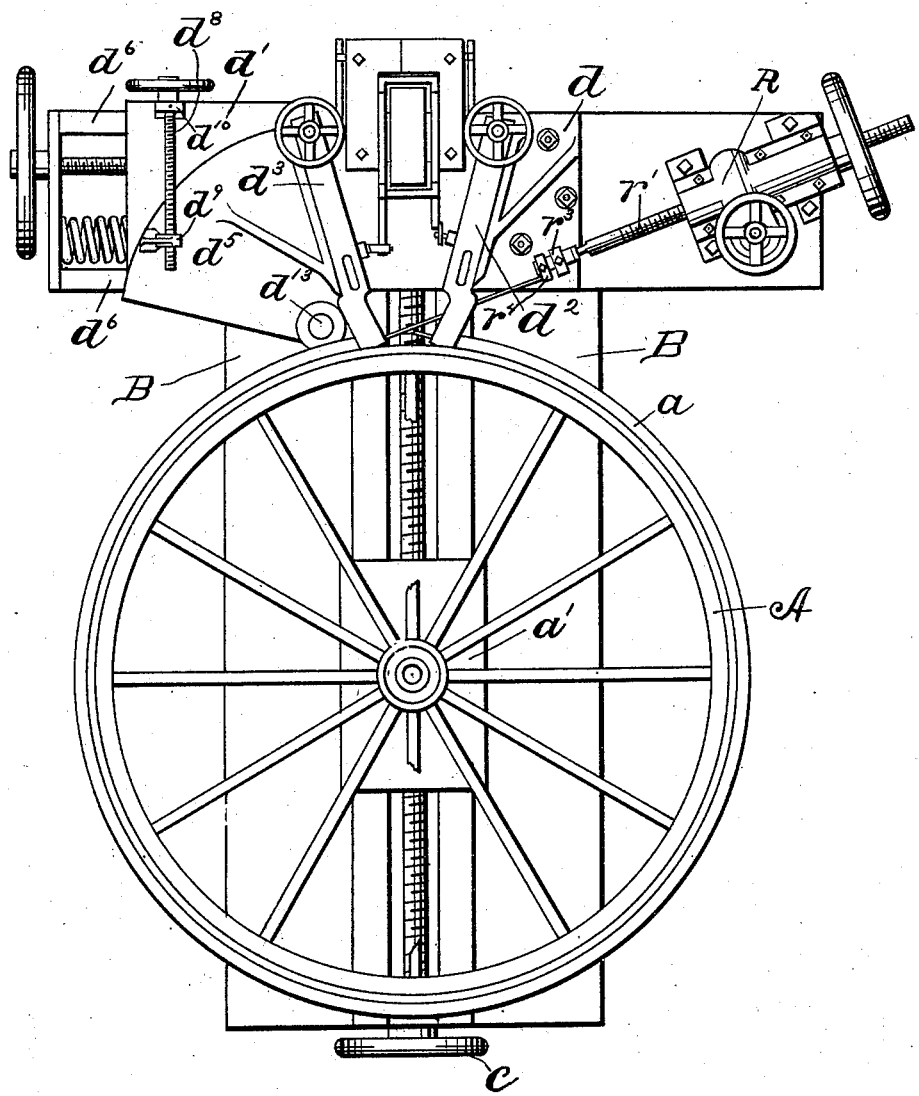

No. 685,917. Patented Nov. 5, 1901.
A. W. GRANT.
DEVICE FOR EQUIPPING VEHICLE WHEELS WITH RUBBER TIRES.
(Application filed July 31, 1899.)
(No Model.) 5 Sheets—Sheet 1.

Witnesses
F. L. Walker
Earl G. Welch

Inventor
Arthur W. Grant
By his Attorney
Paul A. Staley

No. 685,917. Patented Nov. 5, 1901.
A. W. GRANT.
DEVICE FOR EQUIPPING VEHICLE WHEELS WITH RUBBER TIRES.
(Application filed July 31, 1899.)
(No Model.) 5 Sheets—Sheet 2.
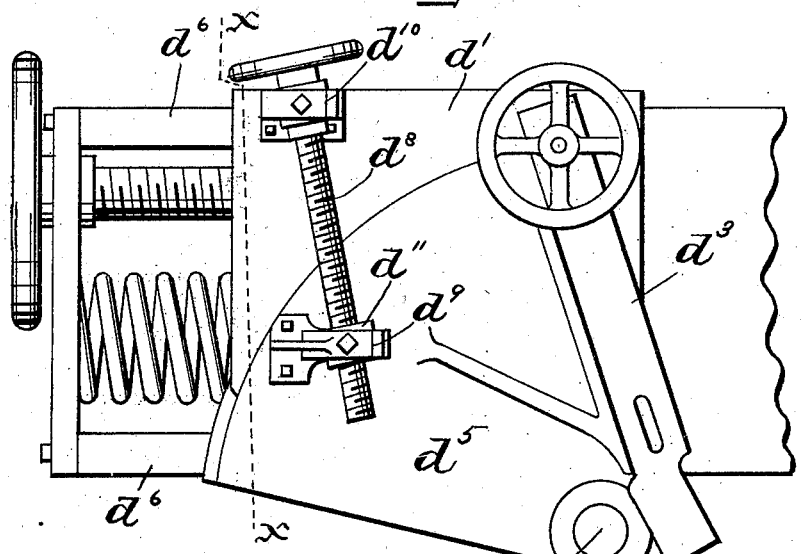
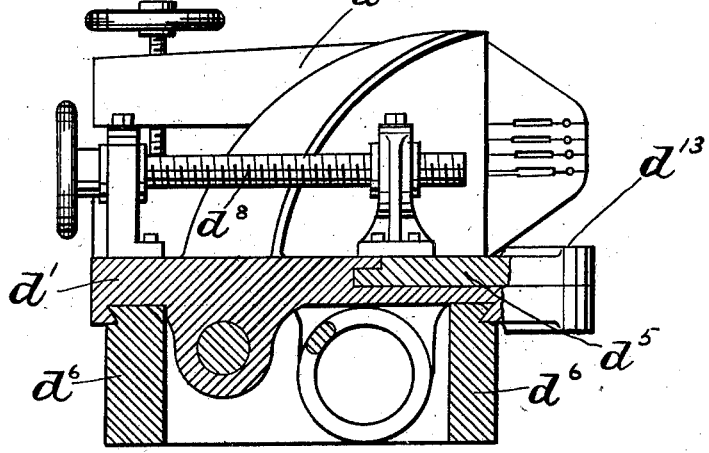
Witnesses
Frank L. Walker
Earl G. Welch
Inventor
Arthur W. Grant
By his Attorney
Paul H. Statop No. 685,917. Patented Nov. 5, 1901.
A. W. GRANT.
DEVICE FOR EQUIPPING VEHICLE WHEELS WITH RUBBER TIRES.
(Application filed July 31, 1899.)
(No Model.) 5 Sheets—Sheet 3.
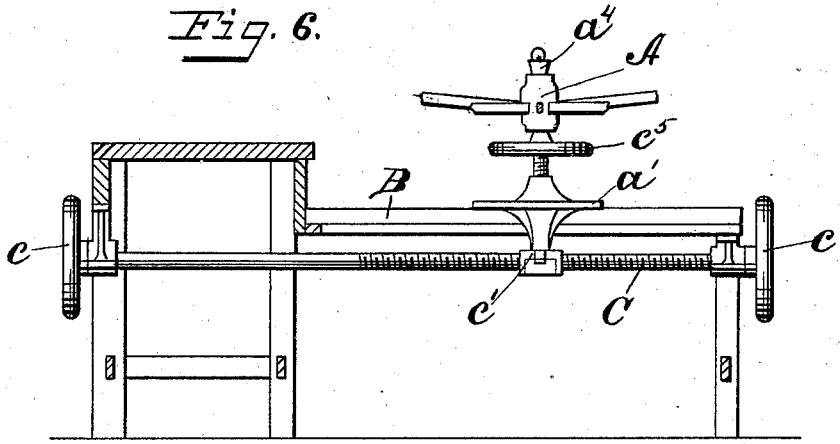
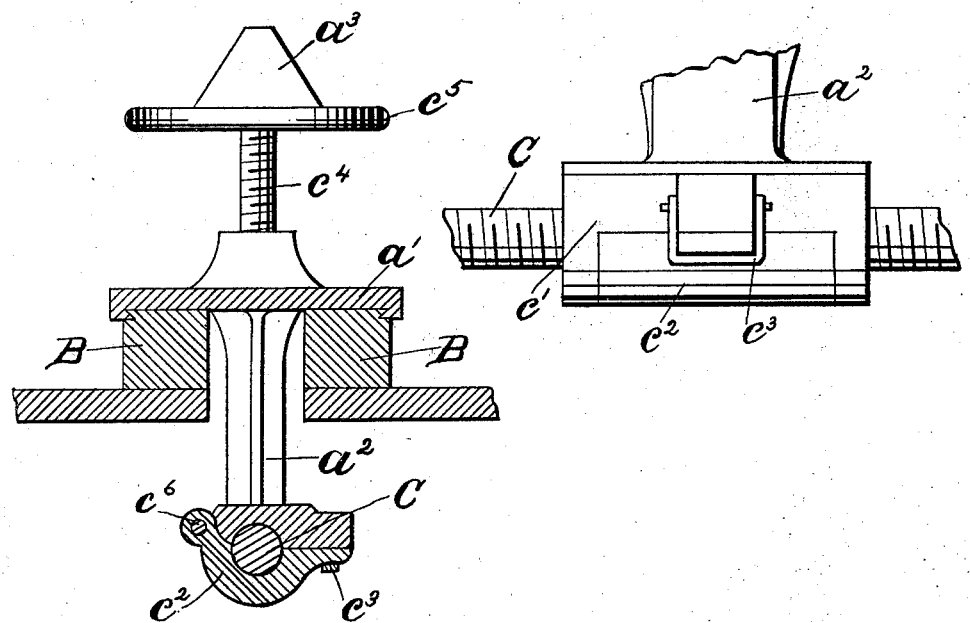

No. 685,917. Patented Nov. 5, 1901.
A. W. GRANT.
DEVICE FOR EQUIPPING VEHICLE WHEELS WITH RUBBER TIRES.
(Application filed July 31, 1899.)
(No Model.) 5 Sheets—Sheet 4.
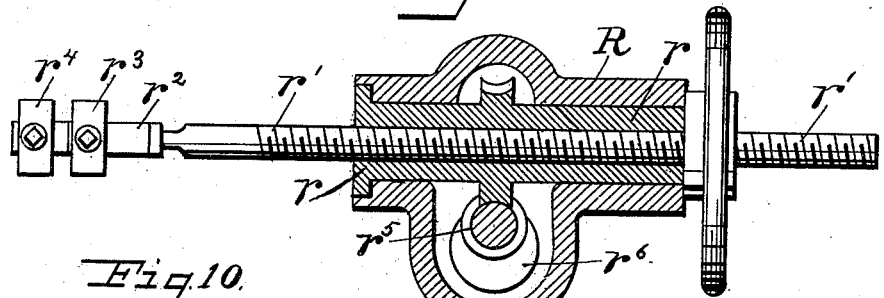
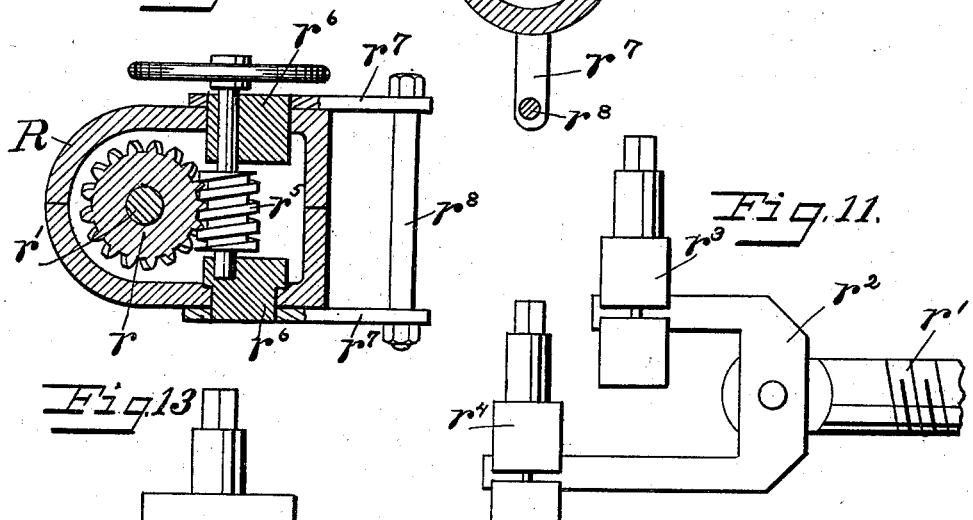
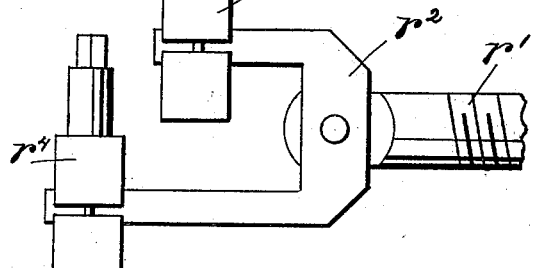
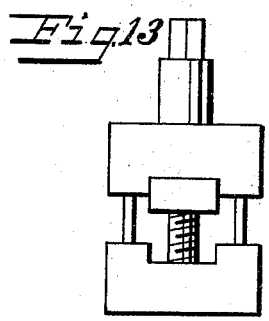
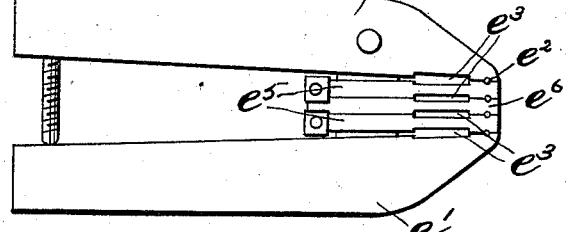
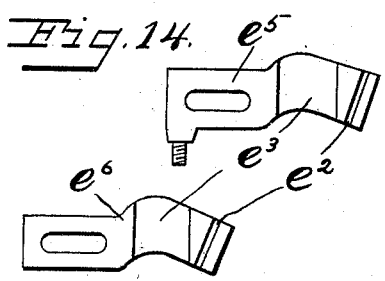
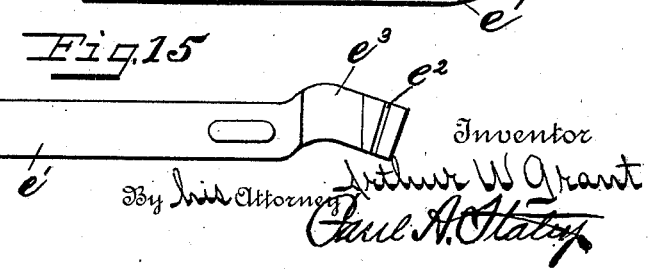
Witnesses
F. L. Walker
Carl G. Welch
Inventor
Arthur W. Grant
By his Attorney
Carl A. Staley No. 685,917. Patented Nov. 5, 1901.
A. W. GRANT.
DEVICE FOR EQUIPPING VEHICLE WHEELS WITH RUBBER TIRES.
(Application filed July 31, 1899.)
(No Model.) 5 Sheets—Sheet 5.
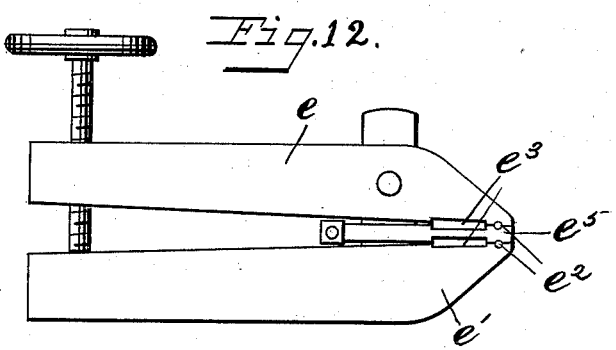
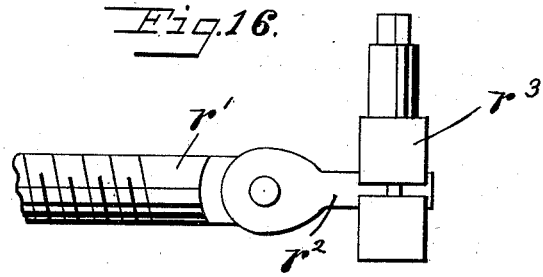
Witnesses
F. L. Walker
Earl G. Welch
By his Attorney
Inventor
Arthur W Grant
Paul H. Stater

UNITED STATES PATENT OFFICE.

ARTHUR W. GRANT, OF SPRINGFIELD, OHIO, ASSIGNOR, BY MESNE ASSIGNMENTS, TO THE CONSOLIDATED RUBBER TIRE COMPANY, OF JERSEY CITY, NEW JERSEY, A CORPORATION OF NEW JERSEY.

DEVICE FOR EQUIPPING VEHICLE-WHEELS WITH RUBBER TIRES.

SPECIFICATION forming part of Letters Patent No. 685,917, dated November 5, 1901.

Application filed July 31, 1899. Serial No. 725,573. (No model.)

*To all whom it may concern:*

Be it known that I, ARTHUR W. GRANT, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices and methods for equipping vehicle-wheels with rubber tires, and relates more particularly to improvements in that form of tire-setting machine set forth and fully described in my prior application, Serial No. 648,333.

In the accompanying drawings, Figure 1 is a plan view of my device. Fig. 2 is a plan view of the movable head. Fig. 3 is a cross-section on the line $x\ x$ of Fig. 2. Figs. 4 and 5 are detail views of the screw-threaded sleeve and support. Fig. 6 is a section of the main frame, showing wheel adjustment. Fig. 7 is a detail view of the movable support for vehicle-wheel. Fig. 8 is a detail view of the hinged split nut. Fig. 9 is a detail view of the tension device. Fig. 10 is a detail view of the auxiliary worm tension device. Figs. 11, 13, and 16 are detail views of the wire-holding devices on the end of screw-threaded shaft of tension device, the devices shown in Figs. 11 and 13 being especially adapted for four wires and in Fig. 16 for two wires. Figs. 14, 15, and 17 are detail views of the jaws for four wires; and Fig. 12 is a detail view of jaws for two wires.

Like parts are represented by similar letters of reference in the several views.

My improved device is expressly adapted for use in fastening and tightening the metallic bands used in the modern form of rubber tires for vehicles, which ordinarily employ two independent wires; but I have shown in the application means for fastening as many as four separate wires, which wires may be used in very large sizes of tires. As fully described in my said prior application, the rubber to form the tire or tread, which is somewhat longer than the circumference of the wheel, is placed within the channel of the wheel, and the wires extending through said rubber, with their ends projecting beyond the same, are fastened after the rubber has been placed within the rim of the channel, and the rubber is forcibly drawn along the band or bands to close the space between the ends of the rubber where the joints in the bands are formed.

In the said drawings, A represents a vehicle-wheel with the rubber $a$ shown within the rim of the channel of the wheel. Said wheel is shown supported by a movable support $a'$, which support is adapted to slide on the frames B B, constituting the bed of my machine. From this movable support $a'$ there extends downwardly between the two frames B B a projecting arm $a^2$, to which is attached a hinged split nut $c'$. There extends through this split nut a screw-threaded shaft C, with hand-wheels $c\ c$ at each end of said shaft. This split-nut $c'$ has its bottom part hinged at $c^6$ and the upper and lower parts held together by the hinged flap $c^3$. The hinged or lower swinging portion of the said split nut is threaded to correspond with the screw-threaded shaft C, which works in same; but the other part of said nut is not threaded, so that by releasing the flap $c^3$ and dropping the hinged portion $c^2$ after the ends of the bands have been fastened together the wheel can be readily removed from the band-holding devices. On said sliding support there is formed a cone-shaped bearing for a screw $c^4$, with its hand-wheel, said hand-wheel being also formed with a bearing adapted to receive a stud $a^4$. The vehicle-wheel is pivoted on said stud and by means of the connections I have shown can be raised and lowered by moving the hand-wheel $c^5$, and at the same time the wheel can be adjusted by means of the hand-wheel $c\ c$ until its channel or groove will stand opposite to the band-holders hereinafter shown. At the head of said bed I have attached a stationary head $d$, with a band-holding device attached thereto, in a position oblique to the wheel, (marked $d^2$,) consisting, preferably, of jaws $e$ and $e'$, formed with offset portions, as shown in Figs. 1 and 15. Adjacent to said stationary head $d$ is a movable head $d'$, slidingly mounted on side bars $d^6$ $d^6$, a screw-threaded shaft engaging said movable head and adapted to adjust the position of same, as shown in Figs. 1 and 2, to which movable head is pivoted at $d^{13}$ a plate $d^5$, and on the plate is mounted another band-holding device, also preferably having jaws. Each of said jaws are reduced at their forward ends and are formed with offset portions, as shown in Figs. 1 and 15. Means for adjusting or regulating said swiveled plate are provided, as follows: A screw $d^8$, having a hand-wheel at its outer end, fits into a screw-threaded sleeve $d^{11}$, pivoted in a stud or support $d^9$, connected to said plate and also fitting into a sleeve pivoted to the stud or support $d^{10}$, which stud or support is attached to the movable head $d'$. The construction of said jaws, as already explained, is such that there is sufficient space between them for readily fastening the wires, and said jaws are attached to the head in a way which permits a transformer to be placed between them, with flexible connections to the plates of said jaw, as shown in Fig. 1, and in the event it is found desirable to use four separate wires the current is connected to the plates $e^5$ $e^5$, as shown in Fig. 17; but in using two wires the connections are made in the manner set forth in my said prior application. The upper jaw of each holding device is pivoted, and they have clamping-screws, as described in my former application, the jaws and plates having openings for gripping the wires and auxiliary openings $e^3$.

The function of the transformer is to fuse the ends of the wires, and the fixed and movable heads $d$ and $d'$ are made to carry the band-holding devices oblique to the periphery of the wheel, so as to obtain sufficient space between the jaws of the band-holding devices to readily fuse or weld the wires and at the same time permits the transformer to be placed between said band-holding devices in close proximity to the same, thus making a compact and effective combination for holding and fusing or welding the wires.

My tightening device consists of a screw-threaded shaft $r'$, with a hand-wheel at its upper end, said hand-wheel being a part of sleeve $r$ to operate the same and fastened to an attaching device $r^2$, consisting of the parts $r^3$ and $r^4$. Said shaft $r'$ fits into a screw-threaded sleeve $r$ in the casing R, which is attached to the bed of the machine. Two blocks $r^6$ $r^6$ are fitted in said casing, as shown in Fig. 10, and the shaft, with hand-wheel at the upper end and worm between the blocks, extends through the upper block into the lower block, near the side of said blocks next to the sleeve $r$. To said blocks $r^6$ are attached arms $r^7$, which are connected to a bolt $r^8$. By moving the bolt $r^8$, in combination with the arms $r^7$, attached thereto, said blocks are revolved sufficiently to throw the pinion $r^5$ in and out of gear with said sleeve, it being understood that said pinion $r^5$ is normally kept out of engagement therewith. It will thus be seen that in my tightening device by having the worm $r^5$ eccentrically journaled I can readily throw said worm into and out of engagement with the sleeve, and then by means of the hand-wheel, when the pinion is in engagement, I can vary the tension of the retaining-bands to a very slight degree and can tighten very easily all sizes of tires employing two or more retaining-wires. By means of this auxiliary worm device an additional tension is given over and above that obtained by the movement of the hand-wheel that is a part of the sleeve $r$.

I operate my device as follows: Having clamped one end or the ends of the retaining-bands in the stationary jaws and having attached the other ends to the tension device, passing the wires through the movable jaws and the auxiliary openings of the stationary jaws and having the rubber tire within the channel of the rim, I then move the wheel toward the band-holding devices by operating the shaft C until the jaws of the band-holding devices enter the channeled rim of the wheel. I then tighten the wires by means of my tension device, the operation of which I have fully described. Having tightened the wires to the proper degree, I grip the wires in the jaws of the movable band-holding devices and then sever the wires from the tension device within the space formed between the band-holding devices. By operating the screw-threaded shaft $d^8$, the plate $d^5$ and the band-holding device $d^3$ can be positively moved so that the ends of the wires will be brought into the desired position for fastening, it being evident that I have here shown positive means for regulating the proximity of the ends of the wires and holding said ends together until fastened without danger of the movable jaws being thrown out of adjustment. After the wires have been fastened the wheel can be readily removed by releasing the flap $c^3$, so that the bottom part of the split nut will drop down.

Having thus described my invention, I claim—

1. In a rubber-tire-setting machine for vehicle-wheels, the combination of a stationary band-holding device arranged oblique to the periphery of the wheel, and a movable band-holding device also oblique to said wheel, a transformer between said band-holding devices, and means for flexibly connecting said transformer to the said band-holding devices.

2. In a rubber-tire-setting machine, the combination of two sets of band-holding devices one set being movable, a main tension device with attaching devices arranged to engage the wires in a line with the openings in the movable band-holding devices, an auxiliary tension device, consisting of a worm-gearing arranged to be thrown into and out of engagement with said main tension devices.

3. In a tension device for rubber-tire-setting machines, the combination of a screw-threaded shaft with attaching devices connected at one end thereof, a threaded sleeve engaging the other end of said shaft, a worm adapted to engage the teeth of said sleeve, and means for eccentrically mounting the worm for throwing said worm in and out of engagement with said sleeve.

4. The combination of a transformer, with two sets of band-holding devices one set being placed on each side of said transformer, a pivoted plate supporting one set of band-holding devices, flexible connections between said transformer and said band-holding devices, and means for adjusting said plate.

5. In a rubber-tire-setting machine, the combination of two sets of band-holding devices, one set being connected to a plate pivoted on a sliding head, a screw-threaded shaft engaging said sliding head and adapted to adjust the position of same, a screw, and a sleeve engaging the outer end of said screw and attached to the movable head, a threaded sleeve engaging the inner end of said screw and attached to the pivoted plate and adapted by the movement of said screw to vary the position of the jaws attached to said plate.

In testimony whereof I have hereunto set my hand this 26th day of July, A. D. 1899.

ARTHUR W. GRANT.

Witnesses:
CHAS. I. WELCH,
EARL G. WELCH.